United States Patent [19]

Dalman

[11] Patent Number: 4,488,756
[45] Date of Patent: Dec. 18, 1984

[54] APPARATUS FOR ELEVATING A TRUCK BODY

[76] Inventor: Lew Dalman, Box 261, Baldur, Manitoba, Canada, R0K 0B0

[21] Appl. No.: 462,685

[22] Filed: Jan. 31, 1983

[30] Foreign Application Priority Data

Feb. 4, 1982 [GB] United Kingdom ............... 8203184

[51] Int. Cl.³ .............................................. B60P 1/16
[52] U.S. Cl. ................... 298/19 B; 298/22 P; 298/38
[58] Field of Search ............. 298/19 B, 22 R, 22 P, 298/38; 105/261 A

[56] References Cited

U.S. PATENT DOCUMENTS

| 1,709,364 | 4/1929 | Nelson | 298/38 X |
| 2,476,694 | 7/1949 | Bourne-Vanneck | 298/19 B X |
| 2,959,302 | 11/1960 | Cawood | 298/22 P X |
| 2,988,399 | 6/1961 | Wood | 298/19 B X |

FOREIGN PATENT DOCUMENTS

| 623956 | 7/1961 | Canada | 298/19 B |
| 908091 | 8/1972 | Canada | 298/19 B |
| 55-148626 | 11/1980 | Japan | 298/19 B |
| 400463 | 10/1933 | United Kingdom | 298/22 R |
| 937657 | 9/1963 | United Kingdom | 298/22 R |

Primary Examiner—Leslie J. Paperner
Attorney, Agent, or Firm—Stanley G. Ade

[57] ABSTRACT

An elevation apparatus for lifting a truck box pivotally mounted on the truck chassis comprises a first main cylinder piston arrangement arranged at the front end of the truck box and a second subsidiary piston/cylinder arrangement provided adjacent the midpoint of the truck box. The secondary piston/cylinder arrangement includes two cylinders, one on either side of the chassis and arranged in the lowered position to lie substantially along the chassis with the piston directly coupled to the truck box and the cylinder coupled directly to the chassis. A latch mechanism for the piston of the main cylinder acts to lock the piston head in position on the chassis when the truck box is lowered and to release the piston head when the truck box is raised so that the piston head moves free from the latch mechanism when the secondary cylinders raise the truck box beyond the extent of the first piston.

6 Claims, 6 Drawing Figures

APPARATUS FOR ELEVATING A TRUCK BODY

BACKGROUND OF THE INVENTION

This invention relates to apparatus for elevating a truck body particularly for trucks which are designed primarily but not solely for the transportation and unloading of grain, gravel and other comminuted material. Such apparatus is generally known as a truck hoist and can be used on trucks, semi-trailers or farm trucks.

Conventional truck hoists as commercially manufactured and used, fall into two groups. In the first group, a telescopic ram assembly extends between the front of the truck body and the frame or chassis of the truck which, when elevated, tilts the truck body around a rear pivot thus permitting the material to slide from the truck body. In order to achieve sufficient elevation of the body relative to the chassis, the telescopic ram assembly must include a number of stages. Multi-cylinder telescopic type lifting devices of this type are relatively expensive and can require considerable modification to the truck frame and to the truck body. Such multi-stage cylinders are only single acting, thus allowing the box to rattle on the frame when travelling over rough roads with the box empty.

In a second group, a scissors-type hoist is used, situated between the frame of the truck and engaging the truck body approximately half way along. A disadvantage of this conventional scissors-type is that it requires considerable modification of the frame and a heavy duty structure, all of which add considerable costs to the installation. The scissors-type lift is also difficult to install without interfering with the drive shaft of the truck.

In both cases, the hoist lifts from a single point so that lateral stability of the body relative to the chassis is poor when it is being lifted.

Attempts have been made to overcome these disadvantages in apparatus disclosed in a number of patent specifications. Particularly in U.S. Pat. No. 2,988,399 there is disclosed an apparatus in which the hydraulic ram comprises only a single stage which lifts the truck body to a first partly elevated position. Following this partial elevation, the body is further elevated by a complex arrangement in which the spacing between the rear axles and the ram is reduced thus acting to lever the body upwardly relative to the rear axles. This solution is extremely complex and requires considerable further modification to the truck chassis thus completely overcoming any advantage which may be obtained by replacing the conventionally used equipment.

In a second prior arrangement disclosed in Japanese laid open application No. 55-148626, a first multi-stage hydraulic cylinder arrangement is supplemented by the use of a scissors-type hydraulic lifting arrangement. Again this apparatus is totally unsatisfactory in that it incorporates the disadvantages of both the conventional types of apparatus.

SUMMARY OF THE INVENTION

It is one object of the invention therefore to provide an improved apparatus for elevating a truck body which is simple to install without requiring substantial modification of either the truck body or the truck chassis.

Accordingly, the invention provides an apparatus for elevating a truck body, of the type which is pivotal relative to the truck chassis about an axis at the rear of the body, comprising first hydraulic ram means, means for mounting the first hydraulic ram means on one of the body and chassis at the front thereof, means for releasably coupling the first hydraulic ram means to the other of the body and chassis, means for extending the first hydraulic ram means such that the full extension thereof elevates the body to a partly elevated position, second hydraulic ram means, means for coupling the second hydraulic ram means to the chassis and the body at a position intermediate the first hydraulic ram means and the pivot axis, means for extending the second hydraulic ram means whereby full extension thereof elevates the body from said partly elevated position to a fully elevated position in which the first hydraulic ram means is separated from said other of the body and chassis.

It is one advantage of the invention therefore that the first hydraulic ram adjacent the front of the truck body can comprise merely a single stage piston arrangement which is therefore of relatively small diameter and can be accommodated in front of the truck body without difficulty.

It is a further advantage of the invention that the second hydraulic ram means can comprise a pair of piston/cylinder arrangements, one mounted on either side of the truck body so that the truck body is simultaneously lifted from three points thus improving lateral stability.

It is a yet further advantage of the invention that the second hydraulic ram means can act as an overcentre locking device for retaining the truck body in the lowered position.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
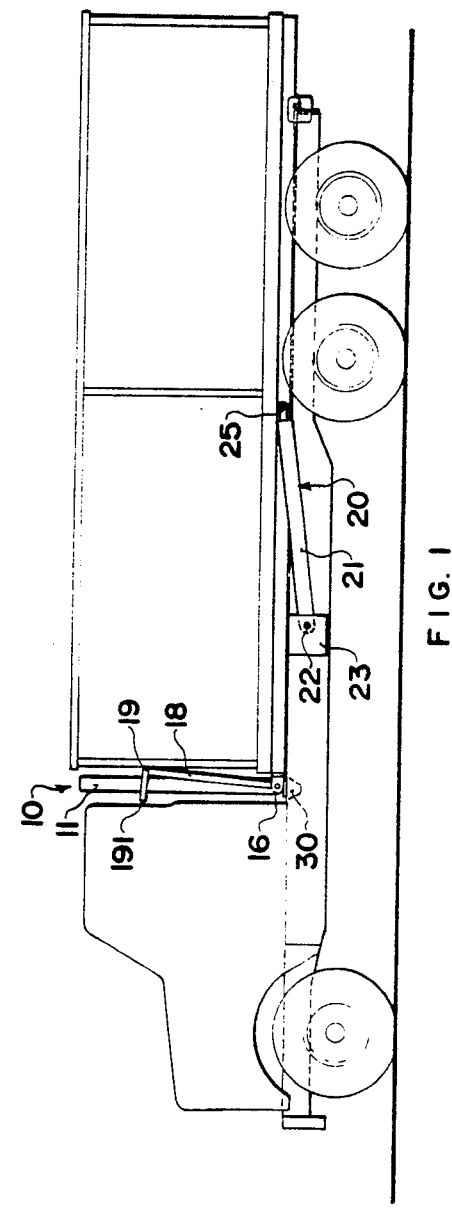
FIG. 1 is a side elevation of a truck including a truck box and an elevating apparatus, with the truck box in the lowered position.
Figure 2:
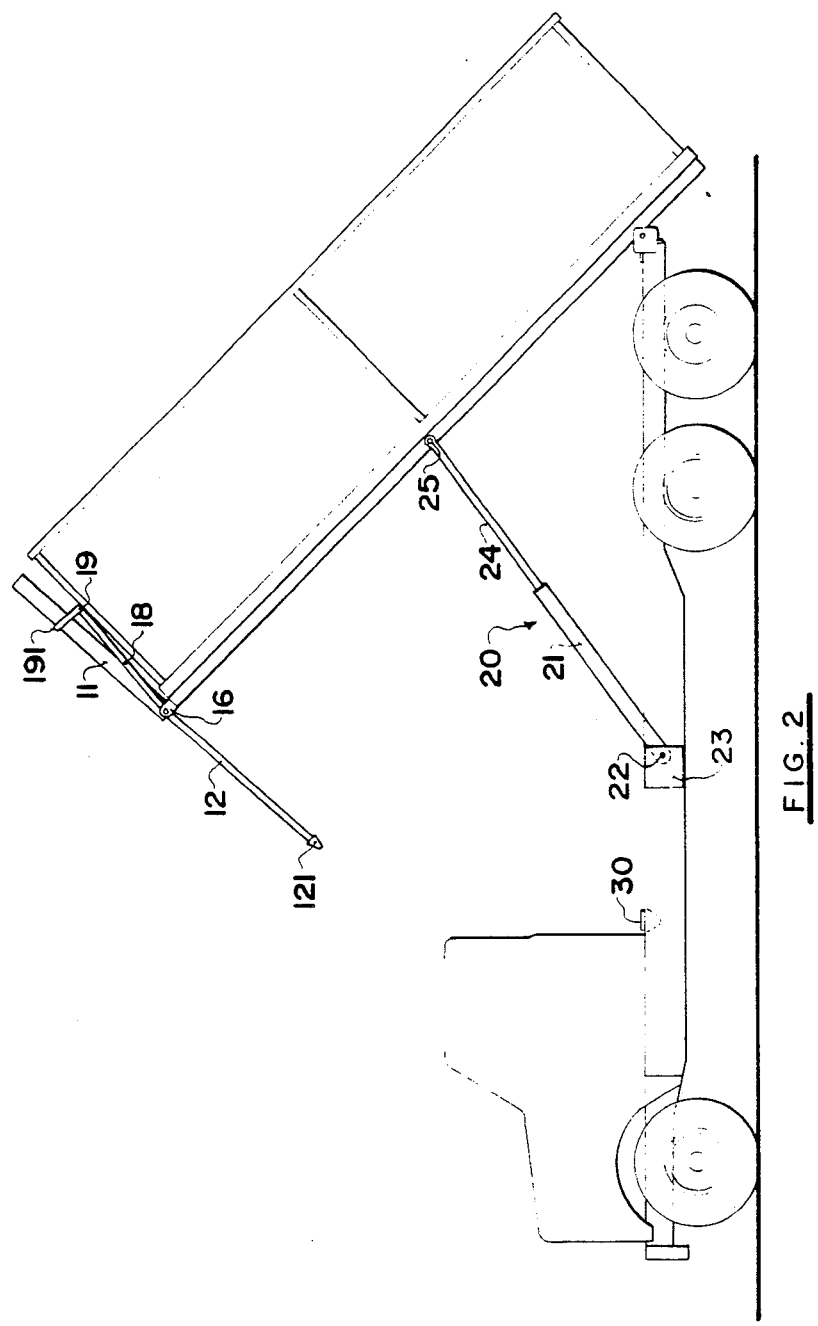
FIG. 2 is a side elevation similar to that of FIG. 1 showing the truck box in the fully elevated position.

A conventional truck and truck box is illustrated in FIGS. 1 and 2 with the truck box being pivotally mounted on the truck chassis about a pivot axis at the rear of the truck chassis. As these features are of conventional construction, no description of the details thereof will be included here.

In order to unload material contained in the truck box, there is provided an elevation apparatus for the truck box comprising a first cylinder and piston arrangement 10 arranged at the midpoint of the front side of the truck box and two additional cylinder and piston arrangements 20 arranged one on either side of the truck box. Only one of the cylinder and piston arrangements 20 is illustrated in FIGS. 1 and 2 but the second can be seen in FIG. 4.

Figure 3:
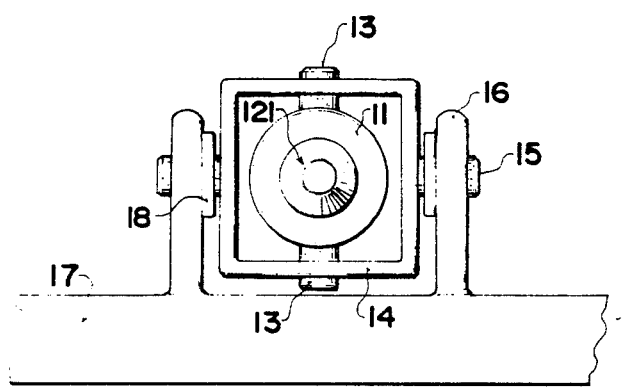
FIG. 3 is a view from underneath of the main elevating cylinder showing the mounting arrangement for the cylinder on the front of the truck box.

The piston and cylinder 10 comprises a cylinder 11 and a single stage piston 12 which is shown retracted into the cylinder in FIG. 1 and in its fully extended position in FIG. 2. As shown in FIG. 3, the cylinder 11 includes at its lower end, a pair of pivot pins 13 which are mounted in a support frame 14 which in turn is pivotal on pins 15 relative to a pair of flanges 16 carried on the lower front cross member 17 of the truck box. In this way, the cylinder is mounted on the truck box such that it moves vertically therewith and such that it has a degree of pivotal movement relative to the flanges 16 both side to side and backward and forward. A pair of upstanding side members 18 are carried on the pivot pins 15 inside the flanges 16 and extend up alongside the cylinder 11. The members 18 are secured to the front of the truck box at a position 19 at which there is attached to the members 18, a strap 191 which wraps around the cylinder to maintain it in the direction generally parallel to the front of the truck box, but with a small degree of movement forward and backward and side to side. The side to side movement is only of the order of six degrees but is necessary to allow the cylinder to pivot to accommodate twisting of the truck box on the chassis of the truck due to an uneven ground or an uneven load. A similar degree of movement is necessary to allow the end of the piston 12 to remain stationary relative to the truck chassis as the truck is elevated by the piston. It will be noted that the cylinder 11 is positioned centrally of the front of the truck box so as to act symmetrically on the truck box in raising it from the truck chassis.

Figure 5:
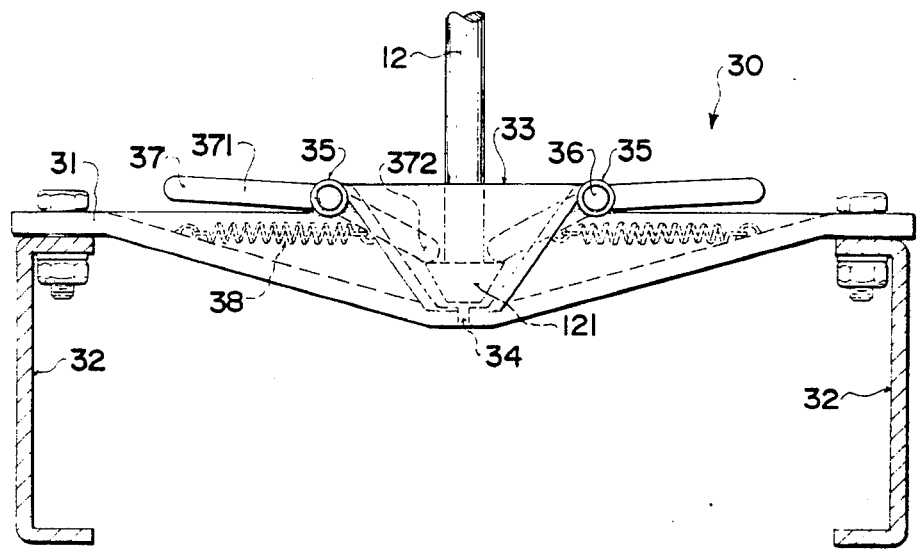
FIG. 5 is a view along the lines 5—5 of FIG. 1 showing the latch mechanism for the piston of the main elevating cylinder but omitting for simplicity of illustration, the cylinder and its mounting means.
Figure 6:
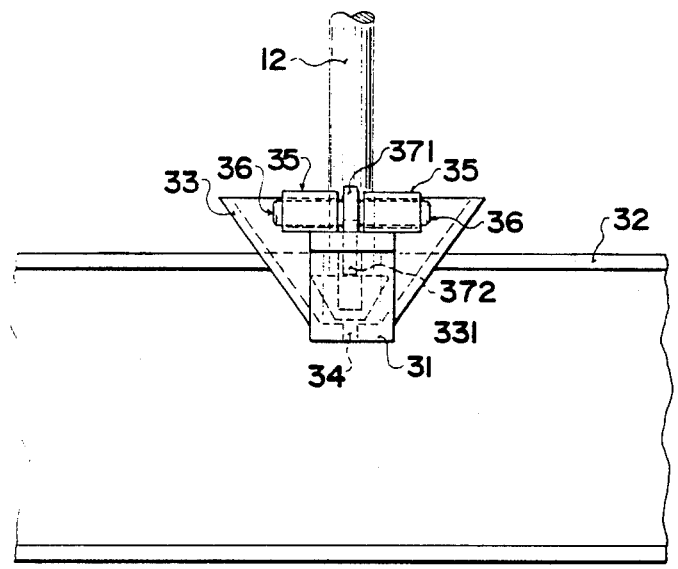
FIG. 6 is a view from one side of the latch mechanism of FIG. 5.

A latch mechanism for the end of the piston 12 is shown in detail in FIGS. 5 and 6 and schematically at 30 in FIGS. 1 and 2. The latch 30 comprises a narrow strap 31 supported transversely to the truck chassis on chassis members 32. The strap 31 is secured to the chassis members 32 by suitable means, as illustrated, a nut and bolt arrangement. The strap 31 descends relative to the top of the chassis members 32 on either side to a midpoint at which is secured a hollow pyramid shaped cup 33 of square base and top, the top having a transverse dimension the same as that of the strap and being welded thereto so that the cup sits centrally of the strap facing upwardly to receive the end of the piston 12. A hole 34 at the midpoint of the strap 31 allows any collected liquid to escape from the cup 33. On each side of the cup 33 is secured a pair of bushes 35 for receiving pivot pins 36 of a latching lever 37. The lever 37 includes a pair of arms, the first of which 371 as shown in FIG. 5, extends across the truck chassis generally in the plane thereof and the second of which 372 extends into the cup 33 through a slot 331 to a position inwardly of the side of the cup 33. A spring 38 is connected to the strap 31 and to the arm 372 of the lever 37 so that the lever 37 is biassed to a position in which the arm 371 extends upwardly out of the plane of the chassis and the arm 372 is outside the cup 33. The piston 12 carries at its end a frusto-conical head 121.

In the lowered position of the truck box shown in FIG. 1, each of the flanges 16 rests upon a respective one of the arms 371 turning the lever 37 against the bias of the spring 38 into a position where the arm 372 extends into the cup 33 to a position behind the head 121 of the piston 12. Thus, the piston 12 is held in position in the cup 33 by the levers 37. Furthermore, force applied by the cylinder 11 to the piston 12 to retract it further into the cylinder 11, acts to pull the piston 12 upwardly against the levers 37 thus tending to draw the truck box downwardly further into contact with the arms 371 of the levers 37. Accordingly, the truck box is locked in its lowered position by the latch 30.

Extension of the piston 12 from the cylinder 11 acts to lift the flanges 16 of the truck box from the arms 371. Furthermore, it will be noted that in the position shown in FIG. 5, there is a small space between the bottom of the piston head 121 and the bottom of the strap 31 so that on extension of the piston 12, the head 121 moves downwardly to the bottom of the strap thus freeing the rear of the head 121 from the arms 372. Thus, as the piston extends from the cylinder 11 and the truck box commences to lift, the arms 37 are free to pivot about the bushes 35 and to take up a position where the arms 372 are outside the cup 33. In this way, the piston head 121 is no longer locked in the cup 33.

Turning again to FIGS. 1 and 2, the second piston and cylinder arrangements 20 have a cylinder 21 pivotally mounted on the side of the truck chassis by pivot pins 22 supported in bushes provided in the side of the chassis and in a plate 23 parallel to the chassis and supported thereon by suitable flanges. The piston 24 of the cylinder 21 is pivotally mounted on the truck box at the midpoint thereof on pivot pins 25. It should be noted that the pivot pins 22 lie approximately three-quarters of the distance from the rear of the truck chassis to the latch mechanism 30 such that the distance between the pins 25 and the pins 22 in the lowered position of the truck box is the length of the piston and cylinder in the retracted condition.

Figure 4:
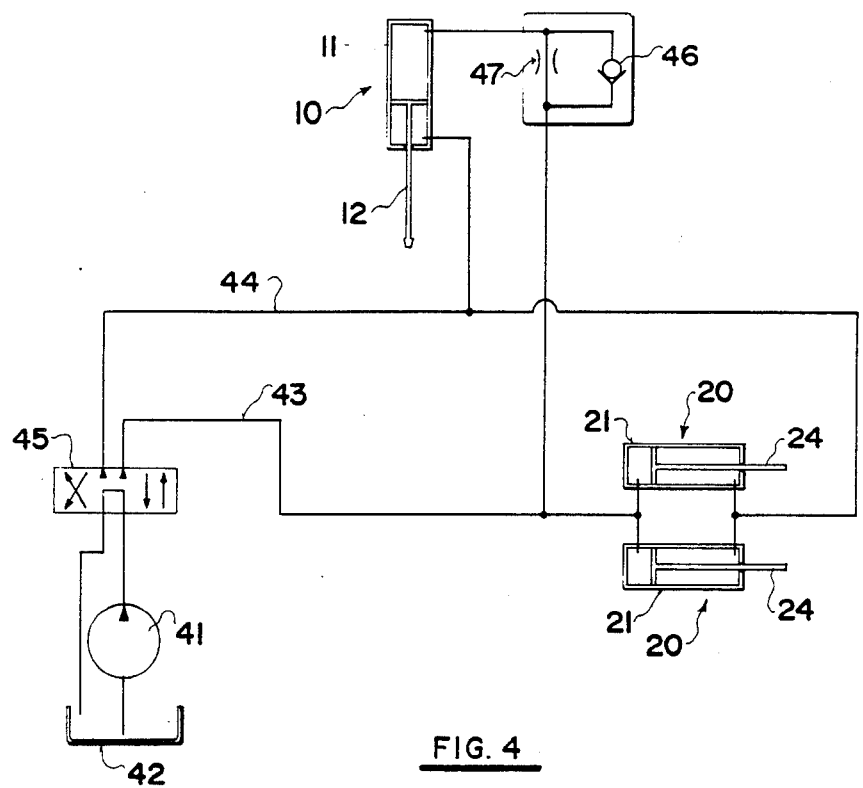
FIG. 4 is a schematic illustration of the hydraulic circuit for the three cylinders of the elevating apparatus.

Turning now to FIG. 4, the cylinder and piston 10 and the cylinder and piston 20 are illustrated schematically with the hydraulic circuit shown also schematically. It will be appreciated that the hydraulic connections are omitted from FIGS. 1 and 2 for simplicity of illustration.

The circuit comprises a hydraulic pump 41 and a sump 42 which can be connected to a first path 43 or to a second path 44 selectively by a valve 45. The path 43 is connected to the cylinders 21 and 11 on the side thereof to expel the piston 24 and 12 respectively from the cylinder. The path is directly connected to the cylinders 21 and to the cylinder 11 through a one-way valve 46. The path 44 is connected to the retraction side of the cylinders 24 and 11 in both cases directly. Thus, when it is required to raise the truck box, the valve 45 is moved to the left as shown in FIG. 4 so that the hydraulic pump 41 is connected to the path 43 whereby hydraulic force is applied to the cylinders 21 and 11 to expel the pistons 24 and 12 respectively. In view of the fact that the cylinder 11 has considerably greater mechanical advantage relative to the pivot of the truck box than do the cylinders 21, the main motive force for raising the truck box in the initial part of its movement comes from the cylinder 11 and piston 12.

The increased mechanical advantage of the cylinder 11 relative to the cylinders 21 comes from the facts that the distance of the point of application from the pivot axis is approximately double and that the angle of the piston 12 is generally at right angles whereas the pistons 24 lie in the initial movement of the truck box at a small acute angle to the base of the truck box whereby the moment of the pistons 24 about the pivot axis is relatively small. When the piston 12 has reached its full extension, the pistons 24 are only partly extended relative to the cylinders 21. At this point, as explained previously, the levers 37 are separated from the piston head 121 thus releasing it from the latch 30.

In view of the fact that the partial raising of the truck box to the full extent of the piston 12 deposits some of the load from the truck box and the fact that the angle of the pistons 24 relative to the base of the truck box has increased, means that the force supplied by the pistons 24 is sufficient to lift the truck box further thus separating the piston head 121 from the latch 30 as shown in FIG. 2. The raising of the truck box continues to the full extent of the pistons 24 at which position the truck box can be held until the load is fully deposited.

When it is required to lower the truck box back to its lowered position for travelling, the valve 45 is moved to the right as shown in FIG. 4 whereby the path 44 is connected to the pump 41 and the path 43 is connected to the sump 42. Hydraulic pressure is thus applied to the retraction side of the cylinders 21 and 11. The cylinders 21 thus act to retract the pistons 24 thus gradually lowering the truck box. As the line 43 connects the sump 42 to the cylinder 11 through the one-way valve 45, fluid is prevented from flowing through the one-way valve 45 and hence flows through a restrictor 47 whereby the retraction of the piston 12 into the cylinder 11 takes place more slowly than the retraction of the pistons 24. Furthermore, the action of gravity assists the retraction of the pistons 24 so that when the pistons 24 are retracted to a sufficient extent that the head 121 reaches the latch 30, the piston 12 is still effectively fully extended. Thus, as the angle of the pistons 24 to the base of the truck box gradually decreases and hence the force applied thereby gradually decreases, the piston 12 takes over the lowering action to complete the lowering down to the truck chassis.

As explained previously, on completion of lowering the piston head 121 is held in the latch 30 whereby the final force retracting the piston 12 acts to lock the truck box down onto the truck chassis.

The elevation apparatus provided by the piston/cylinders 10 and 20 therefore provides a two-stage lifting arrangement which enables the use of a simple single stage piston/cylinder 10 as the main lifting force and a secondary lifting force provided subsequently by the piston-cylinders 20.

In alternative arrangements (not shown) the front cylinder can be mounted in a tube within the front of the truck box pivotally mounted on the tube at the top end. This avoids the necessity of providing space between the box and the cab and gives more flexibility of mounting of the cylinder to accommodate distortions. Furthermore, the two additional cylinders can be mounted inwardly of the truck frame or replaced by a single piston. If two pistons are used, a hydraulic fluid flow divider can be used to accommodate uneven loads on the box while maintaining a common lifting rate ±5%.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. An apparatus for elevating a truck body, of the type which is pivotal relative to the truck chassis about an axis at the rear of the body, comprising first hydraulic ram means having a cylinder and ram rod, means for mounting the cylinder on the body at the front thereof for pivotal movement, such that the ram rod extends downwardly for contacting the chassis, means for releasably coupling the ram rod to the chassis, means for extending the first hydraulic ram means such that the full extension thereof elevates the body from a lowered position on the chassis to a partly elevated position, a pair of second double-acting hydraulic ram means, means for directly coupling the pair of second hydraulic ram means to the chassis and to the body at transversely spaced positions intermediate the first hydraulic ram means and the pivot axis, means for extending the second hydraulic ram means whereby full extension thereof elevates the body from said partly elevated position to a fully elevated position in which the ram rod is separated from said chassis, and means for limiting the pivotal movement of said cylinder whereby lowering of said body causes the ram rod to contact said releasable coupling means, said pair of second hydraulic ram means being arranged such that in the lowered position of the body hydraulic force in a retraction direction thereof acts to bias the body into said lowered position.

2. Apparatus according to claim 1 wherein the means for extending the first hydraulic ram means and the means for extending the second hydraulic ram means include means for supplying a pressurized hydraulic fluid arranged such that pressurized hydraulic fluid is supplied to both the first hydraulic ram means and the second hydraulic ram means simultaneously to elevate the body to the partly elevated position.

3. Apparatus according to claim 1 wherein the releasable coupling means includes means shaped to locate the first hydraulic ram means in position on said other of the body and the chassis.

4. An apparatus for elevating a truck body, of the type which is pivotal relative to the truck chassis about an axis at the rear of the body, comprising first hydraulic ram means having a cylinder and ram rod, means for mounting the cylinder on the body at the front thereof for pivotal movement, such that the ram rod extends downwardly for contacting the chassis, means for releasably coupling the ram rod to the chassis, means for extending the first hydraulic ram means such that the full extension thereof elevates the body from a lowered position on the chassis to a partly elevated position, a pair of second double-acting hydraulic ram means, means for directly coupling the pair of second hydraulic ram means to the chassis and to the body at transversely spaced positions intermediate the first hydraulic ram means and the pivot axis, means for extending the second hydraulic ram means whereby full extension thereof elevates the body from said partly elevated position to a fully elevated position in which the ram rod is separated from said chassis, and means for limiting the pivotal movement of said cylinder whereby lowering of said body causes the ram rod to contact said releasable coupling means, said pair of second hydraulic ram means being arranged such that in the lowered position of the body hydraulic force in a retraction direction thereof acts to bias the body into said lowered position, wherein the releasable coupling means includes latch means for latching the first hydraulic ram means to said other of the body and the chassis.

5. Apparatus according to claim 4 wherein the latch means is operated by movement of the body into the lowered position.

6. An apparatus for elevating a truck body, of the type which is pivotal relative to the truck chassis about an axis at the rear of the body, comprising first hydraulic ram means having a cylinder and ram rod, means for mounting the cylinder on the body for pivotal movement and such that the ram rod extends downwardly for contacting the chassis, means for releasably coupling the ram rod to the chassis, a pair of second double-acting hydraulic ram means, means for directly coupling the second hydraulic ram means to the chassis and to the body at transversely spaced positions, the angle and position of the second hydraulic ram means being arranged relative to that of the first such that the first hydraulic ram means has a greater mechanical advantage relative to the axis, means for extending the first hydraulic ram means such that the full extension thereof elevates the body to a partly elevated position, means for extending the second hydraulic ram means whereby full extension thereof elevates the body from said partly elevated position to a fully elevated position in which the ram rod is separated from said chassis, and means for limiting the pivotal movement of said cylinder whereby lowering of said body causes the ram rod to contact said releasable coupling means, said pair of second hydraulic ram means being arranged such that in the lowered position of the body hydraulic force in a retraction direction thereof acts to bias the body into said lowered position.

* * * * *